UNITED STATES PATENT OFFICE.

AUGUST BLANK, CARL HEIDENREICH, AND JOHANNES JANSEN, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

AZO DYESTUFFS.

1,150,656.  Specification of Letters Patent.  Patented Aug. 17, 1915.

No Drawing.   Application filed April 4, 1914.   Serial No. 829,667.

*To all whom it may concern:*

Be it known that we, AUGUST BLANK, CARL HEIDENREICH, and JOHANNES JANSEN, doctors of philosophy, chemists, citizens of the German Empire, residing at Leverkusen, near Cologne-on-the-Rhine, Germany, have invented new and useful Improvements in Azo Dyestuffs, of which the following is a specification.

The present invention relates to the manufacture and production of new and valuable azo dyestuffs capable of dyeing cotton in green shades which are rendered fast to washing by aftertreatment with formic aldehyde. Such of the new dyes as still contain an amino group can be diazotized on fiber and yield, when developed with suitable developers, e. g. beta-naphthol, fast green shades.

The new products are after being dried and pulverized in the shape of their alkaline salts dark powders soluble in water. Upon reduction with stannous chlorid and hydrochloric acid they are broken up into an aromatic amino compound, a diamino compound, a meta-aminobenzo derivative, e. g. a meta-aminobenzenyl or a meta-aminobenzoyl derivative of the 2-amino-5-naphthol-7-sulfonic acid and a benzene derivative.

The process for producing the new dyes consists: 1, in combining diazotized: alpha- or beta-naphthylamin or their sulfonic acids with a suitable middle component capable of being diazotized after combination, in rediazotizing the monoazo dyes thus obtained, combining them with a meta-aminobenzenyl derivative of the 2.5-amino-naphthol-7-sulfonic acid such as meta-amino-benzenyl-1.2-naphthylenediamin-5-oxy-7-sulfonic acid or meta-aminobenzenyl-1-thio-2-amino-naphthylene-5-oxy-7-sulfonic acid, in diazotizing the products thus obtained and coupling them with resorcin or meta-aminophenol; 2, in combining diazotized: acidyl-para-diamins or para-nitramins, or derivatives of sulfonic acids of these compounds with a suitable middle component capable of being diazotized after combination, in rediazotizing the monoazo dyes thus obtained, combining them with a meta-aminobenzenyl derivative of the 2.5-aminonaphthol-7-sulfonic acid, such as meta-aminobenzenyl-1.2-naphthylenediamin-5-oxy-7-sulfonic acid or meta-aminobenzenyl-1-thio-2-amino-naphthylene-5-oxy-7-sulfonic acid, in diazotizing the products thus obtained, coupling them with resorcin or meta-aminophenol, and finally (according to the character of the amin initially used) in either eliminating the acidyl radical or in reducing the nitro group; 3, in either further diazotizing the dyes obtained according to No. 2 and coupling them after diazotation with resorcin or meta-aminophenol, or (according to the character of the amin initially used in the process of 2) in either eliminating the acidyl radical from the acidyl compounds or reducing the nitro group in the products obtained according to No. 2 prior to the final diazotation and combination, in tetrazotizing the aminoazo dyestuffs thus obtained and in coupling them with 2 molecules of resorcin or meta-aminophenol or with one molecule of meta-aminophenol and one molecule of resorcin.

Examples of the initial diazotizable components are: oxalyl-para-phenylenediamin sulfonic acid, 2-oxalylamino-4-chloro-5-amino-1-anisol, 2-acetylamino-5-amino-1.4-dichlorobenzene, nitro-para-xylidin, acetyl-1.4-naphthylenediamin-6-sulfonic acid, alpha- and beta-naphthylamin and their sulfonic acids. Examples of the second components are: 1.7-naphthylamin sulfonic acid, 1-amino-2-naphtholethylether, cresidin, alpha-naphthylamin, 1-amino-5-naphthol. Examples of the third components are: meta-aminobenzoyl-2-amino-5-naphthol-7-sulfonic acid, meta-aminobenzenyl-1.2-naphthylenediamin-5-oxy-7-sulfonic acid, meta-aminophenyl-1.2-naphthothiazole-5-oxy-7-sulfonic acid.

In order to illustrate the new process more fully the following examples are given, the parts being by weight:

Example 1: 26 parts of oxalyl-para-phenylenediamin sulfonic acid are dissolved in 300 parts of hot water with the aid of sodium carbonate, the solution is cooled with ice to 5° C., acidulated with 35 parts of hydrochloric acid (spec. grav. 1.19) and diazotized with 6.9 parts of sodium nitrite. The diazo compound is then added to a solution of 22.3 parts of 1-amino-2-naphtholethylether (hydrochlorid) in 500 parts of water and to the mixture which has to be stirred a solution of sodium acetate is slowly added until the copulation is complete. The aminoazodyestuff is filtered off and is then dissolved in 500 parts of water with the aid of sodium carbonate, cooled with ice to 0° C. and diazotized with 6.9 parts of sodium nitrite and 40 parts of hydrochloric acid. The mixture is stirred until the nitrous acid has disappeared and the diazo compound thus obtained is added to a solution of 35.5 parts of meta-aminobenzenyl-1.2-naphthylenediamin-5-oxy-7-sulfonic acid of the formula:

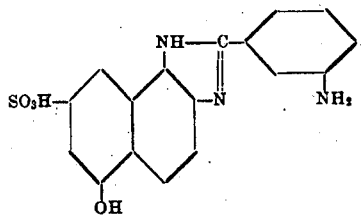

in 1000 parts of water and 35 parts of sodium carbonate. After six hours the dyestuff is salted out, dissolved in water and diazotized with 6.9 parts of sodium nitrite and 50 parts of hydrochloric acid. When the nitrous acid has disappeared, the diazo compound is added to a solution of 11 parts of resorcin in 500 parts of water and 40 parts of sodium carbonate at a temperature of from 0 to 5° C. Subsequently it is slowly heated to boiling, 150 parts of soda lye (30 per cent.) are added to it and it is boiled for half an hour. Then the soda lye is neutralized with hydrochloric acid, the dyestuff is salted out, pressed and dried. It yields on cotton green shades rendered fast to washing by aftertreatment with with formaldehyde. The new dye is after being dried and pulverized in the shape of its sodium salt a dark powder easily soluble in water with a greenish coloration, soluble in concentrated sulfuric acid with a yellowish-black coloration. Yielding upon reduction with stannous chlorid and hydrochloric acid para-phenylenediamin sulfonic acid, 1.4-diamino-2-naphtholethylether, meta-aminobenzenyl-1.2-naphthylenediamin-6-amino-5-oxy-7-sulfonic acid and aminoresorcin. It has in a free state most probably the formula:

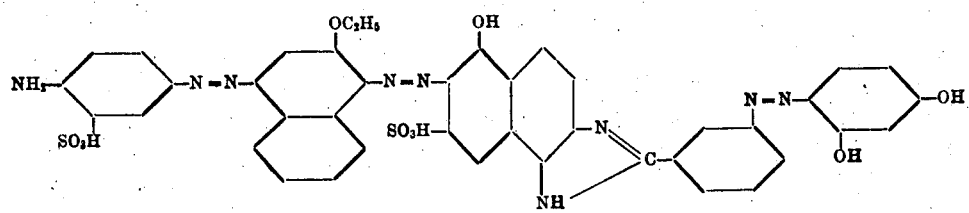

Instead of oxalyl-para-phenylenediamin sulfonic acid other acidyl-diamins or their sulfonic acids can be used. Instead of 1 amino-2-naphtholethylether another suitable compound, such as 1.7-naphthylamin sulfonic acid and instead of aminophenol resorcin, etc., can be used.

Example 2: 22.3 parts of 2-naphthylamin-8-sulfonic acid are dissolved in hot water containing sodium carbonate, cooled to 10° C. and diazotized with 35 parts of hydrochloric acid and 6.9 parts of sodium nitrite. The diazo compound is then added to a solution of 22.3 parts of hydrochlorid of 1-amino-2-naphtholethylether and to this mixture while it is being stirred a solution of sodium acetate is slowly added until the coupling is complete. The dyestuff is filtered off, dissolved in water and sodium carbonate and diazotized with 6.9 parts of sodium nitrite and 40 parts of hydrochloric acid. When the nitrite has disappeared, the diazo compound is added to a solution containing 37.2 parts of meta-aminobenzenyl 1-thio-2 amino-naphthylene-5-oxy-7-sulfonic acid of the formula:

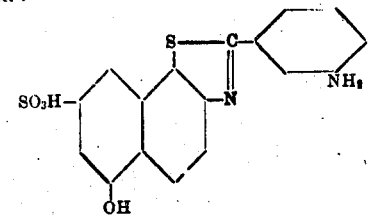

in 1000 parts of water and 35 parts of sodium carbonate. After some hours the solution is heated to 60° C., the dyestuff is salted out, pressed off, dissolved in water and rediazotized with 6.9 parts of sodium nitrite and 50 parts of hydrochloric acid, the diazo compound is then added to a solution containing 11 parts of resorcin in 500 parts of water and 40 parts of sodium carbonate, heated to 70° C. and the dyestuff is then salted out. It yields on cotton brilliant green shades which are rendered fast to washing by after-treatment with formaldehyde.

Example 3: The product: oxalyl-para-phenylenediamin + 1.7-naphthylamin sulfonic acid + meta-amino-benzenyl-1.2-naphthylenediamin-5-oxy-7-sulfonic acid is produced according to Example 1. The dyestuff is then mixed up with 100 parts of water and 150 parts of caustic soda lye (30 per cent.) and boiled for half an hour. The caustic soda is neutralized with hydrochloric acid, the dyestuff is salted out and pressed. It is redissolved in water and tetrazotized with 13.8 parts of sodium nitrite and 80 parts of hydrochloric acid. The mixture is stirred until the nitrous acid has disappeared. Then the tetrazo compound is added to a solution containing 22 parts of resorcin in 500 parts of water and 64 parts of sodium carbonate which is heated to 70° C. The dyestuff is salted out with common salt, pressed off and dried. It yields on cotton green shades.

The process of Example 3 is carried out in the same way if instead of 2 molecules of resorcin either 2 molecules of meta-aminophenol or 1 molecule of meta-aminophenol and 1 molecule of resorcin are used.

Other first components may be used such as 2-oxalylamino-4-chloro-5-amino-1-anisol, 2-acetylamino-5-amino-1.4-dichlorobenzene, nitro-para-xylidin, acetyl-1.4-naphthylenediamin-6-sulfonic acid, alpha-naphthylamin, beta-naphthylamin, etc.

We claim:—

1. The new polyazo dyes being derived from a meta-aminobenzo derivative of the 2-amino-5-naphthol-7-sulfonic acid which are after being dried and pulverized in the shape of their alkaline salts dark powders soluble in water; yielding upon reduction with stannous chlorid and hydrochloric acid an aromatic amino compound, a diamino compound, a meta-aminophenyl derivative of the 2-amino-5-naphthol-7-sulfonic acid and a benzene derivative dyeing cotton in green shades which are rendered fast to washing by after treatment with formic aldehyde, substantially as described.

2. The new polyazodyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid an aromatic amino compound, a diamino compound, a meta-aminobenzenyl derivative of the 2-amino-5-naphthol-7-sulfonic acid and a benzene derivative; dyeing cotton in green shades which are rendered fast to washing by aftertreatment with formic aldehyde, substantially as described.

3. The new polyazo dyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid an aromatic diamin, another diamino compound, a meta-aminobenzenyl derivative of the 2-amino-5-naphthol-7-sulfonic acid and a benzene derivative; dyeing cotton in green shades which are rendered fast to washing by aftertreatment with formic aldehyde, substantially as described.

4. The new polyazo dyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid a para-phenylenediamin, another diamino compound, a meta-aminobenzenyl derivative of the 2-amino-5-naphthol-7-sulfonic acid and a benzene derivative; dyeing cotton in green shades which are rendered fast to washing by after treatment with formic aldehyde, substantially as described.

5. The new polyazo dyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid para-phenylenediamin sulfonic acid, another diamino compound, a meta-aminobenzenyl derivative of the 2-amino-5-naphthol-7-sulfonic acid and a benzene derivative; dyeing cotton in green shades which are rendered fast to washing by aftertreatment with formic aldehyde, substantially as described.

6. The new polyazo dyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid an aromatic amino compound, a diamino derivative of naphthalene, a meta-aminobenzenyl derivative of the 2-amino-5-naphthol-7-sulfonic acid and a benzene derivative; dyeing cotton in green shades which are rendered fast to washing by aftertreatment with formic aldehyde, substantially as described.

7. The new polyazo dyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid an aromatic diamin, a diamino derivative of naphthalene, a meta-aminobenzenyl derivative of the 2-amino-5-naphthol-7-sulfonic acid and an aromatic amin; dyeing cotton in green shades which are rendered fast to washing by aftertreatment with formic aldehyde, substantially as described.

8. The new polyazo dyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid a para-phenylenediamin, a diamino derivative of naphthalene, a meta-aminobenzenyl derivative of the 2-amino-5-naphthol-7-sulfonic acid and a benzene derivative; dyeing cotton in green shades which are rendered fast to washing by aftertreatment with formic aldehyde, substantially as described.

9. The new polyazo dyes being derived from a meta-aminobenzenyl derivative of the 2-amino-5-naphthol-7-sulfonic acid which are after being dried and pulverized in the shape of their alkaline salts dark powders soluble in water; yielding upon reduction with stannous chlorid and hydrochloric acid a para-phenylenediamin, a diamino derivative of naphthalene, a meta-aminobenzenyl derivative of the 2-amino-5-naphthol-7-sulfonic acid and amino resorcin; dyeing cotton in green shades which are rendered fast to washing by aftertreatment with formic aldehyde, substantially as described.

10. The new azodye which has in a free state most probably the formula:

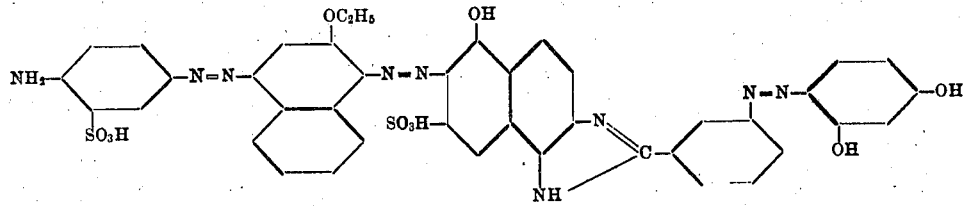

which is after being dried and pulverized in the shape of its sodium salt a dark powder easily soluble in water with a greenish coloration; soluble in concentrated sulfuric acid with a yellowish-black coloration; yielding upon reduction with stannous chlorid and hydrochloric acid para-phenylenediamin sulfonic acid, 1.4-diamino-2-naphthol-ethylether, meta-aminobenzenyl-1.2-naphthylenediamin-6-amino-5-oxy-7-sulfonic acid and aminoresorcin; dyeing cotton green shades, which are rendered fast to washing by aftertreatment with formic aldehyde, substantially as described.

In testimony whereof we have hereunto set our hands in the presence of two subscribing witnesses.

AUGUST BLANK.
CARL HEIDENREICH.
JOHANNES JANSEN.

Witnesses:
 LOUIS VANDORY,
 HAUR BRÜCKNER.